Sept. 30, 1958 — R. DA S. MELLO — 2,853,713
SANITARY WATER-CLOSET BOWL
Filed June 20, 1955

United States Patent Office 2,853,713
Patented Sept. 30, 1958

2,853,713

SANITARY WATER-CLOSET BOWL

Romualdo da Silva Mello, Rio de Janeiro, Brazil

Application June 20, 1955, Serial No. 516,720

3 Claims. (Cl. 4—69)

The present invention relates to sanitary bowls.

Conventional sanitary or toilet bowls, although in common use in the more developed countries, are subject to various deficiencies as regards the receiving and disposal of waste materials.

It is an object of the invention to overcome these deficiencies which will hereinafter be described in greater detail.

In the drawing in which conventional bowls are compared with the improvements provided by the invention:

Figs. 1 and 2 illustrate, in longitudinal section, two conventional types of bowls;

Figs. 3 and 4, respectively, are top and sectional views of a further conventional bowl;

Figure 1:
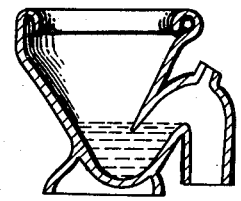
Figure 2:
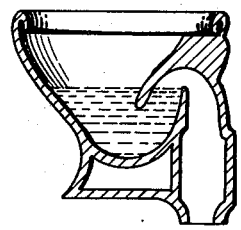

With regard to the conventional bowls shown in Figs. 1 and 2, there exists the possibility of the splashing of contaminated water when fecal matter is discharged into the same. This is not hygienic and exposes the user to germs and dirt.

Figure 3:
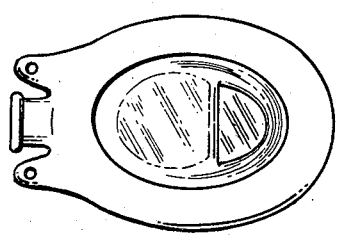
Figure 4:
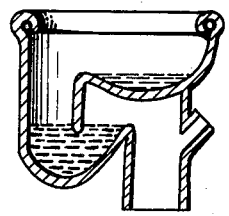

The "dished bottom" bowl shown in Figs. 3 and 4 is similarly deficient as regards the splashing of water and, moreover, provides a ledge for the accumulation of fecal matter whereby deposits may reach the body of the user. Further, this type of bowl is readily dirtied and requires constant cleaning.

Figure 5:
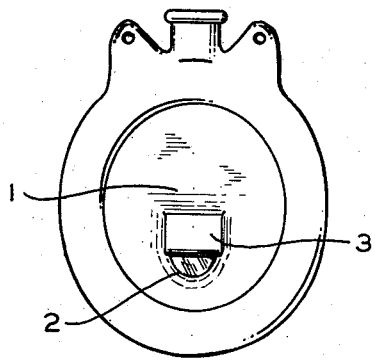
Fig. 5 is a top view of a bowl provided in accordance with the invention.
Figure 6:
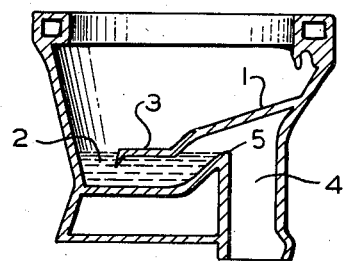
Fig. 6 is a longitudinal section of the bowl of Fig. 5.

In accordance with the invention, there is provided, instead of a conventional dished bottom which is horizontal and has a large surface, a substantially different bowl as illustrated in Figs. 5 and 6. Said bowl has certain similarities to the ordinary dish bottomed bowl and to the conventional bowl, but differs structurally and functionally from both.

The bowl of the invention has a comparatively steep slope along a fairly long expanse 1, from back to front, so that the water surface or trap is restricted to the front part 2 of the device and thus is spaced from the point of fall of fecal matter. Said fecal matter will thus fall against the surface of bowl 1 which has a steep slope and becomes horizontal at terminal part or ledge 3, before reaching water trap 2. Fecal matter dropped onto this steep slope 1 slides rapidly along same and comes to rest on the terminal part 3 which preferably has a surface above the normal water level in the bowl and which constitutes in fact a receptacle wherefrom it is finally removed by the water discharge. A discharge conduit 4 is connected in siphon-like arrangement to trap 2 and includes an apex 5 determining the normal water level in the trap.

In this way fecal matter may be easily inspected and, since it does not fall directly on the water, it will not give rise to splashing water onto the user. Said receptacle 3, not directly beneath falling fecal matter, contains no more than a minimum quantity of water such as a few millimeters, which is only enough to prevent fecal matter from adhering to the lower bowl wall. Sometimes fecal matter adheres so well that removal of the same becomes very difficult and requires the use of mechanical means such as a brush. In the novel bowl such a drawback is avoided because fecal matter projected upon the steeply inclined wall 1 will rapidly slide therefrom and because flushing takes place in the direction of fall of the fecal matter. It is possible for the user to place a sheet of tissue paper over the sloping part of the bowl, at the point of incidence of the fecal matter whereby the latter is tobogganed downward by flushing. This is, in fact, one of the advantages of the new bowl since the dish-bottomed bowl and the conventional bowl have walls which are almost vertical with a large water surface so that a greater sprinkling action results.

As has been said above, the flushing with water is carried out in the same direction as the fecal matter is to be carried away and thus completely washes the bowl. This also prevents said matter from depositing in the water adjacent the syphon, which water is in very small quantity. Thus both the water and the fecal matter can readily reach the second part of the syphon.

The novel bowl is also based on the hydraulic syphon principle, although with recourse to modified action to prevent complete emptying of the bowl, since the water is intended to isolate the discharge conduit from the outer atmosphere.

The novel bowl may furthermore be used in place of any existing conventional bowl and substitution is very easy because the dimensions and base arrangement may be the same as in conventional bowls.

There will now be obvious to those skilled in the art many variations of the structure set forth, these variations lying within the scope of the invention as defined in the following claims.

What is claimed is:

1. A water closet bowl comprising an outside wall defining an oval shaped cavity having a front and rear, a discharge portion connected to the cavity and including an apex defining a normal water level in the cavity, a first wall portion extending into the cavity and supported by the rear portion of the outside wall, said first wall portion being inclined from the horizontal, a substantially horizontal wall portion extending in front of the center of the bowl, and a second wall portion intermediate said first and horizontal wall portions and integral therewith and supporting said horizontal wall portion substantially at the level of the apex of the discharge portion, said second wall portion being inclined more from the horizontal than said first wall portion.

2. A toilet bowl comprising an outside wall defining an oval shaped cavity having a front and rear, a discharge portion connected to the cavity and including an apex defining a normal water level in the cavity, an inclined wall portion extending into the cavity and supported at its upper end by the rear portion of the outside wall for directly receiving falling fecal matter, a substantially horizontal wall portion supported on and extending from the lower portion of the inclined wall and terminating in front of the center of the bowl, said horizontal wall portion having an upper surface substantially at the level of the apex of the discharge portion.

3. A bowl as claimed in claim 2, wherein the horizontal wall portion includes a front edge having a downwardly projecting lip extending below the level of the apex of the discharge portion.

References Cited in the file of this patent

UNITED STATES PATENTS

| 167,032 | Stanton et al. | Aug. 24, 1875 |
| 496,426 | Moore | May 2, 1893 |

FOREIGN PATENTS

| 533,909 | Germany | Sept. 26, 1931 |